3/24/81 OR 4,257,674

United States Patent [19]
Griffin et al.

[11] 4,257,674
[45] Mar. 24, 1981

[54] ELASTOMERIC FIBER OPTIC SPLICE

[75] Inventors: Wendell L. Griffin, Warren, Pa.; W. John Carlsen, Natick, Mass.; John E. Benasutti, Oil City, Pa.

[73] Assignee: GTE Products Corporation, Stamford, Conn.

[21] Appl. No.: 32,583

[22] Filed: Apr. 23, 1979

[51] Int. Cl.³ .............................................. G02B 5/14
[52] U.S. Cl. ................................................. 350/96.21
[58] Field of Search ........................... 350/96.21, 96.22

[56] References Cited

U.S. PATENT DOCUMENTS

| 3,734,594 | 5/1973 | Trambarulo | 350/96.21 |
| 3,846,010 | 11/1974 | Love et al. | 350/96.22 |
| 3,944,328 | 3/1976 | Kent et al. | 350/96.21 |
| 4,178,067 | 12/1979 | Johnson et al. | 350/96.21 |

FOREIGN PATENT DOCUMENTS

| 2363986 | 7/1975 | Fed. Rep. of Germany | 350/96.21 |
| 1448975 | 9/1976 | United Kingdom | 350/96.21 |
| 1524751 | 9/1978 | United Kingdom | 350/96.21 |

OTHER PUBLICATIONS

W. J. Carlsen, "Elastic One-Piece Splicer for Optical Fibers", *GTE Labs. Record of Invention D-21,145,* Mar. 30, 1978.

*Primary Examiner*—Stewart J. Levy
*Attorney, Agent, or Firm*—Robert E. Walter

[57] ABSTRACT

A splice for holding the ends of optical fibers in end to end relationship includes a pair of sections having mating planar surfaces in engagement. One of the surfaces has an axially aligned groove facing the other surface to form an opening. The fiber receiving member comprises an elastomeric material of sufficient resilience to permit the opening to expandably receive optical fibers dimensioned larger than the opening. A sleeve is mounted about the receiving member for holding the sections in assembled relationship.

8 Claims, 3 Drawing Figures

ELASTOMERIC FIBER OPTIC SPLICE

This invention relates generally to optical fibers and more specifically to splices for coupling fibers.

There are many advantages to transmitting light energy via optical fiber waveguides and the use thereof is diverse. Single fiber waveguides may be used simply for transmitting visible light to a remote location. Complex communication systems may transmit multiple specific optical signals. These devices often require the coupling of fibers in end to end relationship. The coupling is a source of light loss with axial misalignment representing a particularly serious problem. Other factors causing signal loss are angular misalignment of fiber axis, longitudinal separation of fiber ends and reflection from fiber ends.

When placing optical fibers in end to end relationship to minimize light loss, it is desirable to have a rugged splice that can be simply and reliably used in field installations. The junctioned fibers should be protected from environmental factors and be securely held in place.

U.S. Pat. No. 3,734,594 to Trambarulo describes an optical fiber splicer having a deformable angular core disposed between a pair of metallic pressure plates. The fibers to be spliced are inserted into opposite ends of the core and a longitudinal force applied to the plates causes core to deform radially thereby securing the fibers.

U.S. Pat. No. 4,056,305 to McCartney describes a connector having a deformable elastomeric alignment element having a bore therethrough. Two sets of three equal diameter cylindrical rods are mounted in opposite ends of the bore so as to define a space therebetween for receiving an optical fiber. The rods have an interference fit in the central portion of the bore so that compression of the rods results in laterally aligning the fibers.

U.S. Pat. No. 3,948,582 discloses an optical fiber connector with separately formed bodies of substantially elongated form, each body has an axially bore in which the optical fibers can be fitted. The end of one body defines a socket adapted to mate with a plug shaped end of the second body.

SUMMARY OF THE INVENTION

It is desirable that the optical fiber splices be of simple construction and easily assembled in addition to providing an accurate interconnection between the fibers.

According to the principles of the present invention, there is provided a splicer for holding the ends of optical fibers in end to end relationship comprising a fiber receiving member having a pair of sections, said sections having complimentary and mating planar surfaces in engagement, one of said planar surfaces having an axially aligned groove therein facing the other of said planar surfaces to form an opening therewith, said fiber receiving member comprising an elastomeric material of sufficient resilience to permit said opening to expandably receive optical fibers dimensioned larger than said opening, and a sleeve mounted about said receiving member for holding said sections in assembled relationship.

DETAILED DESCRIPTION OF A PREFERRED EMBODIMENT

Figure 1:
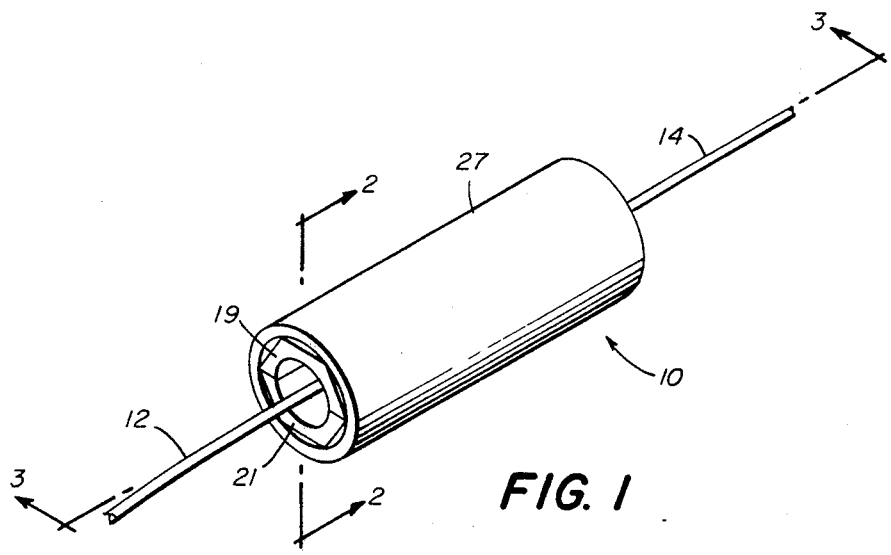
FIG. 1 is a perspective illustration of the splicer assembly with fibers mounted therein.

As illustrated in the drawings, the splicer assembly 10 includes an elongated body or fiber receiving member or portion 11 formed from sections 19 and 21 which are held in opposed assembled relationship by a sleeve 27. The receiving member 11 has an axially aligned opening 24 extending therethrough for receiving fibers 12 and 14.

In accordance with the principles of the present invention, the receiving member 11 is formed from an elastomeric material with opening 24 being smaller than fibers 12 and 14 to be received therein. The receiving member 11 comprises a stable and resilient elastomer which is preferably transparent to permit viewing of the inserted fibers. Typical elastomers include urethane polymers such as Conap tu-90A urethane casting polymer.

The axially aligned opening 24 is a dimension smaller than the fibers 12 and 14 to be received therein. The exact size of the opening should take into account the resilient properties of the elastomer used and the cross sectional area of the fibers 12 and 14. As the fibers 12 and 14 are inserted into opening 24, the walls thereof tend to expand. Elastic restoring forces which are exerted on the fibers 12 and 14 tend to maintain the fibers in proper alignment and hold them within the opening 24. The opening 24 should be dimensioned sufficiently large so that the fiber insertion force is not so great so as to cause breakage or undue bending of the fibers.

Figure 2:
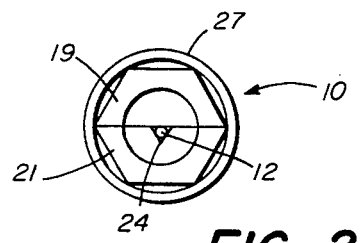
FIG. 2 is an end elevational view of the splicer assembly of FIG. 1.
Figure 3:
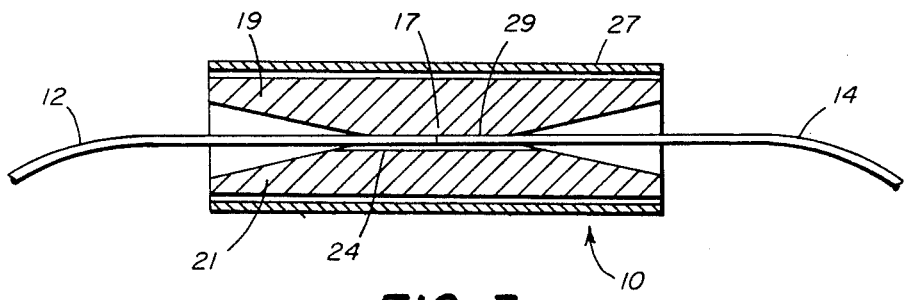
FIG. 3 is a sectional view taken along line 3—3 of FIG. 2 showing the junctioning of the fibers in the splicer assembly.

As illustrated in FIG. 2, the opening 24 preferably has a triangular cross section so that contact is made with a fiber of circular cross section at three locations on the circumference of the fiber. The opening 24 is dimensioned so that the distance from the center of a fiber of circular cross section along the line perpendicular to the sides of the triangular opening 24 is less than the radius of the fiber. As hereinbefore mentioned, the exact size of the opening must take into account the nature of the elastomeric material and the cross sectional area and beam strength of the fiber.

The fibers typically used for a communication system have a silica core of one refractive index and a silica cladding of another generally lower refractive index. An additional outer coating is generally of a plastic material for improving the mechanically handling characteristics of the fiber. In junctioning fibers of this type utilizing the splice of the present invention, it is preferable to remove the outer coating. The ends of the silica fiber may be dipped into an index matching fluid prior to insertion into opening 24 so as to minimize optical losses due to reflections from fiber ends and lubricate the fiber to make insertion easier. An adhesive or uncured epoxy or elastomer resin having the appropriate matching refractive index may similarly be used to form a permanent splice when hardened.

The elongated member of fiber receiving member 11 comprises a pair of sections 19 and 21 having complimentary and mating planar surfaces in engagement. As illustrated in FIG. 2, the surfaces are in registry along a common plane passing along the center axis of the fiber receiving member 11. Section 24 has an axially aligned V-groove therein facing the planar surface of section 19 so as to form opening 24 with a substantially triangular cross section. The groove in section 21 has side walls that slope outwardly from a central apex spaced from a planar surface. The triangular opening 24 is thus formed by the side walls of the V-groove and the planar surface of section 19.

From a central fiber junctioning region 17, the opening 24 extends along a straight path toward the respective ends of the fiber receiving member 11 for a sufficient distance to permit proper axial alignment of the fibers 12 and 14. The opening 24 flares outwardly from a position interior the fiber receiving member 11 to respective ends thereof. The enlarged portion of opening 24 at either end which tapers to the fiber junctioning region 17 facilitates the insertion of fibers into the receiving member 11.

The sections 19 and 21 are held in opposed assembled relationship by a sleeve 27 mounted thereabout. The receiving member 11 has an exterior shape in the form of an equal sided polygon. The sections 19 and 21 have the mating planar surfaces extending from a corner of the receiving member 11 through the axial center to another corner thereof. When the sleeve 27 is of a cylindrical configuration, the corners of the receiving member 11 are engaged so as to firmly position and hold sections 19 and 21. As illustrated in detail in FIG. 2, the sleeve 27 has a radius of curvature slightly smaller than the distance from the axial center of the receiving member 11 to a corner thereof. Due to the elasticity of the receiving member 11 the sleeve 27 may be force fitted thereabout.

To assemble the connector 10, sections 19 and 21 are placed opposite each other and inserted into sleeve 27. Misalignment between the sections 19 and 21 is not detrimental to final fiber alignment. The V-groove faces a planar surface so that the proper shape of opening 24 is assured. The ends of the fibers 12 and 14 to be junctioned are cleaved. With the fiber coating removed, they may be lubricated with indexing fluids or dipped in an appropriate resin as hereinbefore discussed. One of the fibers 12 is inserted into one end of opening 24 until it extends approximately midway through the receiving member. The other fiber 14 is inserted into the other end until it abuts the end of the first inserted fiber 12. Provided the sleeve 27 and the receiving member 11 are formed from a transparent material, the fiber junctioning can be monitored by a low powered magnifier so as to permit a final checking of fiber alignment. This examination can be used to assure that blocking particles and bubbles are not positioned between the fibers.

It is also contemplated that the fibers can be brought into alignment by using a mechanical jig which holds the splice assembly 10 and the fibers 12 and 14 firmly while slowly pushing the fibers 12 and 14 into the connector via a screw or micrometer means.

As further contemplated, a multiple fiber splice can be effected by molding a plurality of V-grooves into one surface and mating that surface with a planar surface to form a plurality of triangular openings. It is also contemplated that a clamping mechanism can be utilized for providing additional support for the fibers.

While preferred embodiments of this invention have been described and illustrated, it is to be recognized that modifications and variations thereof may be made without departing from the spirit and scope of this invention as described in the appended claims.

What is claimed is:

1. A splice for holding the ends of optical fibers in end to end relationship comprising a fiber receiving member having an external polygonal shaped surface and formed by a pair of sections, said sections having complimentary and mating planar surfaces in engagement, only one of said planar surfaces having an axially aligned groove therein and facing the other of said planar surfaces to form an opening therewith, said fiber receiving member comprising an elastomeric material of sufficient resilience to permit said opening to expandably receive optical fibers dimensioned larger than said opening, and a cylindrically shaped sleeve mounted about said receiving member for holding said sections in assembled relationship.

2. A splice according to claim 1 wherein said groove is a V-shaped groove.

3. A splice according to claim 2 wherein said opening has a substantially triangular cross section for receiving fibers having a substantially circular cross section.

4. A splice according to claim 3 wherein said opening includes a fiber junctioning region, said opening extends from said junctioning region along a straight path toward respective ends of said receiving member.

5. A splice according to claim 4 wherein said opening flares outwardly from a position interior the fiber receiving member to respective ends thereof.

6. A splice according to claim 1 wherein said mating surfaces extend from one corner of the external surface through the axial center of the receiving member to another corner thereof.

7. A splice according to claim 1 wherein said sleeve has a radius of curvature smaller than the distance from the axial center of the receiving member to a corner thereof.

8. A splice according to claim 7 wherein said receiving member comprises a transparent material.

* * * * *

REEXAMINATION CERTIFICATE (717th)
United States Patent [19]
Griffin et al.

[11] B1 4,257,674
[45] Certificate Issued  Jul. 7, 1987

[54] ELASTOMERIC FIBER OPTIC SPLICE

[75] Inventors: Wendell L. Griffin, Warren, Pa.;
W. John Carlsen, Natick, Mass.;
John E. Benasutti, Oil City, Pa.

[73] Assignee: GTE Products Corporation, Stamford, Conn.

Reexamination Request:
No. 90/000,979, Apr. 3, 1986

Reexamination Certificate for:
Patent No.: 4,257,674
Issued: Mar. 24, 1981
Appl. No.: 32,583
Filed: Apr. 23, 1979

[51] Int. Cl.$^4$ ............................................. G02B 6/38
[52] U.S. Cl. ................................................. 350/96.21
[58] Field of Search ................ 350/96.20, 96.21, 96.22

[56] References Cited

U.S. PATENT DOCUMENTS 4,142,776  3/1979  Cherin et al. ................... 350/96.21

FOREIGN PATENT DOCUMENTS 7517996  9/1975  Fed. Rep. of Germany.
2529267  of 1976  Fed. Rep. of Germany.
2531994  2/1977  Fed. Rep. of Germany.
2742084  2/1978  Fed. Rep. of Germany.
1493690  11/1977  United Kingdom.

OTHER PUBLICATIONS

Simple Low-Loss Joints Between Single-Mode Optical Fibers; C. G. Someda; Apr. 4, 1973; pp. 583–597.

*Primary Examiner*—John D. Lee

[57] ABSTRACT

A splice for holding the ends of optical fibers in end to end relationship includes a pair of sections having mating planar surfaces in engagement. One of the surfaces has an axially aligned groove facing the other surface to form an opening. The fiber receiving member comprises an elastomeric material of sufficient resilience to permit the opening to expandably receive optical fibers dimensioned larger than the opening. A sleeve is mounted about the receiving member for holding the sections in assembled relationship.

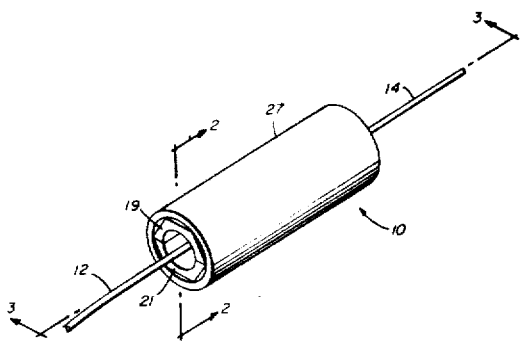

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 7 is cancelled.

Claims 1 and 8 are determined to be patentable as amended.

Claims 2-6, dependent on an amended claim, are determined to be patentable.

1. A splice for holding the ends of optical fibers in end to end relationship comprising a fiber receiving member having an external polygonal shaped surface and formed by a pair of sections, said sections having complimentary and mating planar surfaces in engagement, only one of said planar surfaces having an axially aligned groove therein and facing the other of said planar surfaces to form an opening therewith, said fiber receiving member comprising an elastomeric material of sufficient resilience to permit said opening to expandably receive optical fibers dimensioned larger than said opening, and a cylindrically shaped sleeve mounted about said receiving member for holding said sections in assembled relationship, *said sleeve having an internal surface defined as a substantially continuous curve having an internal radius of curvature smaller than the distance from the axial center of the receiving member to a corner thereof.*

8. A splice according to claim [7] *6* wherein said receiving member comprises a transparent material.

* * * * *